United States Patent Office 3,311,608
Patented Mar. 28, 1967

3,311,608
CELLULOSE ISOCYANATE-ALIPHATIC POLYAMINE ION-EXCHANGE COMPOSITION AND METHOD FOR MAKING SAME
John P. Murphy, 346 Morning View Ave.,
Cleveland, Ohio 44305
No Drawing. Filed Feb. 12, 1963, Ser. No. 257,859
15 Claims. (Cl. 260—212)

This invention relates to ion-exchange materials and more specifically to methods of converting cellulose and its derivatives to ion-exchange compositions, still more specifically this invention is directed to the conversion of cellulose compounds and fibers made therefrom to ion-exchange compositions by reacting cellulose or its derivatives with polyisocyanates and polyamines to obtain products having ion-exchange capacities ranging up to about 3.5 meq. per gram.

Fibers, films, fabrics and related materials containing ion-exchange groups have been prepared from synthetic polymers and natural materials, such as cotton, and formed into many different structures for different purposes. Of these materials, cellulose and more specifically cotton, for example, has been converted to an ion-exchange material but heretofore has exhibited very low exchange capacities. The reason for this probably is due to the fact that only a limited number of exchange sites were able to be added to the molecule without causing it to swell and become highly sensitive to water, making it unsatisfactory for many purposes. Thus, when ion exchange groups, which are hydrophilic in character, are introduced into the cellulose molecule or cotton fiber, they begin to swell and become more sensitive to the water as additional exchange sites are added. The fiber then begins to lose its physical strength and eventually becomes hydrophilic in nature and is converted to a pulpy mass.

Presently, however, some ion-exchange celluloses may be prepared by adding constituents which are basic or acidic to the molecule, either by esterification or etherification, under conditions which retain the fiber structure. These products are comparatively stable and do not dissolve readily or swell excessively in aqueous acid or base solutions. Some of these, for example, are carboxy methylcellulose, succinic esters of cellulose, sulfoethylated cellulose, amino ethyl cellulose, etc. While most of these exchange materials have properties similar to the ion-exchange resins, their greatest disadvantage is the fact that their total exchange capacity is substantially lower. Nevertheless, because of the unique properties of cellulose, it is especially useful for certain applications, such as for the preparation of fabrics, yarn, fibers, papers, etc. Recently, attempts have been made to increase the exchange capacities of these cellulose materials by the addition of quaternary ammonium groups, which are substantially more basic, but this has not been completely satisfactory. Thus, because of the low exchange capacities, most of the known cellulose materials have been limited to chromatographic work where low capacities are no definite disadvantage.

It has been discovered here, however, that comparatively high ion-exchange cellulose materials could be obtained when esterified with polyisocyanate and subsequently reacted with a polyamine which stabilizes and adds ion-exchange sites to the molecule. More specifically, it has been discovered that when cellulose and its derivatives, such as cellulose acetate, particularly in the form of fibers, e.g. wood, cotton, fabric, etc., were esterified with a polyisocyanate to form intermediates having free or unesterified isocyanate groups, they could be reacted further with polyamines which become bonded chemically to the intermediate to add anion exchange sites to the molecule. These cellulose-polyisocyanate-polyamine products are considerably more basic than the cellulose derivatives known heretofore and, thus, in comparison have relatively high exchange capacity. Moreover, one of the more important advantages of the present cellulose ion-exchange materials is that even though a larger number of hydrophilic or exchange sites were added to the molecule, the material did not have a tendency to swell and lose its fibrous structure. This characteristic is particularly important where fibers of cellulose are to be converted to exchange materials, since they can be woven or made into fabric, yarn, or other types of fibrous structures. These are particularly useful in working with high molecular weight organic compounds, such as in the purification of proteins, enzymes, hormones, and the like.

The structure of the present cellulose exchange materials is open and porous, so that the larger molecules not easily absorbed by the resins, can enter and become attached more readily. The properties of the latter, however, would suggest that only the surface of the molecule is available for exchange since the larger molecules are comparatively slow in becoming absorbed. This probably is due to crosslinking of the resin molecule rather than to the number of available exchange sites in the molecule.

Accordingly, it is an object of this invention to provide ion exchange compositions from cellulose and its derivatives.

Still more specifically, it is an object of this invention to provide ion-exchange compositions from the reaction of cellulose and its derivatives with polyisocyanates and polyamines.

Still more specifically, it is an object of this invention to provide fibrous ion-exchange compositions from cellulose and its derivatives which are substantially non-swellable in aqueous acidic and basic mediums, and have comparatively high mechanical strength.

Still more specifically, it is an object of this invention to provide structures of cellulose fibers having an ion-exchange capacity ranging up to about 2.4 meq. per gram of fiber; the ion-exchange fibers prepared by the reaction of cellulose and its derivatives with polyisocyanates and polyamines.

It is still another object of this invention to provide anionic ion-exchange compositions which have comparatively high mechanical strength and can be prepared from fibrous cellulose or cellulosic derivatives by reaction with polyisocyanates and polyamines.

It is still another object of this invention to provide fibers having anionic-exchange sites capable of being formed into fabric by conventional textile procedures, such as weaving or knitting.

It is still another object of this invention to provide a cellulose derivative, such as cellulose acetate in the form of ion-exchange fibers with sufficient mechanical strength and stability in both acidic and basic media so that they can be woven by conventional textile procedures into ion-exchange fabric.

It is still another object of this invention to provide an ion-exchange cellulosic composition which can be converted by conventional methods into fibers or filaments having mechanical strength comparable to the untreated fibers.

It is still another object of this invention to provide a method of preparing ion-exchange cellulose compositions from cellulose and its derivatives by reaction with polyisocyanate and polyamines.

It is still another object of this invention to provide a method of preparing fibers having comparatively high ion-exchange capacities from synthetic and natural cellulose by reacting the cellulose with polyisocyanate and polyamines.

It is still another object of this invention to provide a method of preparing substantially stable ion-exchange cellulosic fibers and fabric made therefrom by reacting natural and synthetic cellulose, such as cotton and cellulose acetates, with an excess amount of polyisocyanates to obtain an intermediate; said intermediate isocyanate-cellulose product further reacted with polyamines to add ion-exchange groups to the product.

These and other objects of the invention will become apparent from a further and more detailed description of the invention.

It has been discovered that ion-exchange compositions, and more specifically ion-exchange fibers, can be prepared by reacting cellulose or cellulose derivatives with effective amounts of polyisocyanates to obtain an intermediate having unreacted or free isocyanate groups which can be further reacted with polyamines to form ion-exchange groups. The cellulose or cellulose derivatives, such as cellulose acetate, are reacted with an excess amount of polyisocyanate to obtain an intermediate which has approximately one mole of polyisocyanate reacted with approximately three moles of cellulose, leaving sufficient unreacted or free isocyanate groups to react with at least 0.20 moles of polyamine. More specifically, approximately one to ten moles of cellulose, or cellulose derivative are esterified with an excess of about 0.5 to 50 moles of polyisocyanate to obtain an intermediate cellulose-isocyanate product having free or unreacted isocyanate groups. These unreacted groups are then reacted with at least about 0.2 moles up to an excess amount of about 50 moles of a polyamine. The amine converts the isocyanate-cellulose intermediate to a composition having an ion-exchange capacity up to about 3.5 meq. per gram. While the reaction which takes place in forming the ion-exchange material is not completely understood, it is believed that the cellulose is esterified with th polyisocyanate to a substantially linear intermediate which has units capable of being crosslinked with the polyamines, at least to the degree that the final product is substantially insoluble in aqueous media.

Heretofore, when cellulose or cellulose fibers were converted to ion-exchange materials, there was a tendency for the fibers to become hydrophilic, to swell, and to become increasingly soluble in water. In addition, the fibers lost their mechanical strength and as such were undesirable in preparing fabrics or textiles for ion-exchange purposes. Consequently, the number of ion-exchange groups capable of being added to the cellulose was limited and the ion-exchange capacity of these fibers was considerably lower than most of the resins. However, in accordance with this invention, even though the cellulose fibers have ion-exchange properties similar to the resins, they are unique in that they are capable of being formed into yarn, fabric, or even paper which is particularly useful, for example, in chromatographic separations. Moreover, the present cellulose ion-exchange products have a rate of ion-exchange much faster than the resins and provide a larger surface area in that the structure is open and porous, thus permitting larger molecules to penetrate and be absorbed by the exchange sites. By partially crosslinking the cellulose with difunctional compounds, such as polyisocyanates, before introducing ion-exchange sites, the fibrous cellulose structure can be maintained and at the same time the exchange capacity can be increased, without causing excess swelling or decreasing mechanical strength.

The cellulose compounds or derivatives referred to for purposes of this invention include methyl cellulose, hydroxyethyl cellulose, hydroxymethyl cellulose, ethyl cellulose, and various derivatives, such as hydroxy propyl methyl cellulose, regenerated cellulose, cellulose acetate, carboxymethyl cellulose, and other cellulose derivatives having hydroxy groups capable of being esterified with the polyisocyanate. In addition to cellulose and its derivatives, mixtures of cellulose, or regenerated cellulose, such as a combination of synthetic or natural fibers interwoven with cellulose fibers in the form of a fabric, may be modified by reacting them with the polyisocyanate and polyamine to obtain ion-exchange materials. These modified fibers can be converted to thread, cord, or cloth by conventional processes of weaving, crimping, twisting, etc. Any of these ion-exchange materials or their fibers can be used, for example, as catalyst or oxidizing agents. Various forms of cellulose, e.g. wood pulp, cotton, or mixtures of natural and synthetic cellulose fibers will react with polyisocyanates to form an intermediate which has not been completely altered and upon subsequent reaction with the polyamine retains the mechanical strength and other physical characteristics of the original material.

The cellulose reacts with polyisocyanate at temperatures ranging from about 180° F. to 220° F. in the presence of a catalyst and under anhydrous conditions to prevent side reactions or polymerization of the isocyanate. When the reaction takes place in the presence of even a small amount of water, the isocyanate has a tendency to polymerize forming polymeric side products, or has a tendency to crosslink making it difficult to react the intermediate with the polyamines. It was found, however, that in the presence of a catalyst, such as trimethyl phosphite, the tendency for side reactions was substantially eliminated and the cellulose was esterified with the polyisocyanates in 2 to 4 hours at temperatures ranging up to about 250° F. It was found, also, that the use of mercerized cotton fibers, for example, further enhanced the reactivity of the cellulose with the polyisocyanate, which is believed to be due to the swelling of the fibers giving an increase of available reaction sites for the isocyanate.

The polyisocyanates include such compounds as: toluene-2-4-diisocyanate, hexamethylene diisocyanate, methylene phenyl diisocyanate, and other aliphatic or aromatic polyfunctions isocyanates. In esterifying the cellulose or fibrous cellulose, the amount of polyisocyanate used is an excess over the stoichiometric amount, with at least 0.1 to 3 moles of polyisocyanate being present in the mixture per mole of cellulose. Amounts in excess, ranging up to 50 moles of polyisocyanate per mole of cellulose, may be used depending upon the reaction conditions. Although there is no arbitrary maximum for the amount of polyisocyanate to insure complete reaction, a substantial excess should be used, which is then removed prior to the reaction of the product with the polyamine. The stoichiometric amount theoretically is that amount needed to esterify completely the hydroxyl groups on the cellulose or its derivatives and, thus, an excess is intended to include proportions greater than the stoichiometric. The required amount of the reaction components will depend, however, on the cellulose and polyisocyanate, since various forms of the cellulose have different degrees of reactivity.

The intermediate cellulose-isocyanate reaction product is discolored and is substantially weaker than the original cellulose material. It is believed that the discoloration is due to oxidation of the isocyanate but this can be avoided by using oxidation inhibitors or by carrying out the reaction in an inert atmosphere, such as nitrogen. It was found, however, that after the reaction product was reacted further with the polyamine, the mechanical strength and color of the material was restored and in the case of cellulose fabric was substantially crease resistant in comparison to the original fabric. The unreacted or remaining isocyanate groups of the polyisocyanate-cellulose intermediate were reacted subsequently with a polyamine in the ratio of approximately at least 0.1 moles of polyamine per polyisocyanate group. Larger amounts, however, ranging in excess of one mole of the polyamine per isocyanate group of the intermediate can be used, since it is advisable to have present an excess of the polyamine to insure complete reaction with the unreacted isocyanate groups of the intermediate product. The precise amount of excess will be determined by the initial reaction products and the kind of polyamine being used. Thus, for example, up to 50 moles of triethylene tetramine may be used per intermediate obtained by reacting one mole of cotton with approximately three moles of toluene diisocyanate.

The discolored cellulose fibers esterified with the polyisocyanate are strengthened by the polyamine which is believed to crosslink the intermediate at least to the extent that the fiber is resistant to water or becomes less soluble and has increased fiber strength. The formation of ion-exchange sites on the isocyanate cellulose product can be effected with a nitrogen compound or polyamine having at least one or more reactive hydrogen atoms, such as ethylene diamine, triethylene tetramine, diethylene triamine, hexamethylene diamine, dimethyl-ethylene diamine, tetramethyl-ethylene diamine, triethylene tetramine, tetraethyl-ethylene diamine, tetraethyl hexamethylene diamine, hexamethylene diamine, and mixtures of polyamines.

The polyamines which impart ion-exchange sites to the intermediate can be modified further by converting the amine-containing units to quaternary ammonium units, which are more basic than the amines. These amine units can be quaternized with polyhalides, such as ethylene dichloride, xylene dichloride, polymethylene dichloride, etc.

Typical examples which illustrate the ion-exchange compositions of this invention are as follows:

EXAMPLE I

Approximately 5 grams of completely dried white mercerized cotton was held at 210° F. to 220° F. for about three hours with intermittent agitation, in approximately 80 grams of toluene diisocyanate and 20 grams of trimethyl phosphite. The mixture was held at this temperature for a period until the cotton changed in appearance from white to a light tan color. The fabric was washed repeatedly with 50 ml. portions of anhydrous ethyl acetate and immersed in 50 grams of triethylene tetramine, heated to temperatures up to approximately 200° F. to 220° F. and held at this temperature for approximately one hour. At this time the fabric again changed from a light tan color back to white. The fabric then was washed in 50 ml. portions of distilled water until the water had a pH below 7.0. The treated cotton fabric was a basic ion exchange material which changed to an intense red on the addition of phenophthalein. The treated fabric then was immersed in a 10 percent solution of sodium chloride in distilled water, which after a period of time became basic, indicating that the chlorine ions had been removed by the ion-exchange fabric, leaving a solution of sodium hydroxide.

EXAMPLE II

Approximately 11 grams of cellulose acetate fibers were treated in the same manner as in Example I and reacted with an excess of toluene diisocyanate for approximately 35 minutes at a temperature of about 210° F. to 230° F. in the presence of 10 percent by weight of trimethyl phosphite. The acetate fiber was washed free of excess diisocyanate and further reacted with triethylene tetramine at a temperature of approximately 230° F. for one hour. The reaction of the diisocyanate with the cellulose acetate caused the fibers to swell and to take on a yellow or orange color. Subsequently, after the intermediate was reacted with triethylene tetramine, the fibers became colorless or slightly off white and less brittle.

EXAMPLE III

Approximately 11 grams of cellulose acetate fabric which was completely dried by distillation with toluene was held for approximately 3 hours at about 220° F. with 80 grams of toluene diisocyanate in the presence of about 5 percent by weight of trimethyl phosphite. The reaction was continued with intermittent agitation for approximately 1½ hours and subsequently washed to remove the excess isocyanate. The intermediate cellulose isocyanate reaction product was reacted further with approximately 50 grams of triethylene tetramine at a temperature of about 200° F. and held for approximately one hour. The fabric subsequently was washed in distilled water until the wash water had a pH below 7. The final product was basic with phenophthalein. The ion-exchange fabric then was immersed in a 10 percent solution of sodium chloride in distilled water until the solution was strongly basic. The fabric removed chlorine ions from the salt solution leaving it basic, indicating an anion exchange fabric.

Approximately 3 grams of the polyamine polyisocyanate cellulose acetate fabric of Example III containing approximately 8.77 percent nitrogen was submerged in a dilute solution of hydrochloric acid and permitted to dry at room temperature. The dried fabric then was analyzed for chlorine to determine the exchange capacity and was found to have approximately 7.8 percent chlorine, or an ion exchange capacity of approximately 2.4 meq. per gram of ion exchange fabric.

EXAMPLE IV

Four square inches of cellulose acetate fabric was reacted at 210° F. to 220° F. for 35 minutes with a mixture of approximately 70 grams of toluene diisocyanate and 7.8 grams of dimethyl phosphite. The intermediate reaction product was washed repeatedly until the wash solutions were free of polyisocyanate. The intermediate product was charged into a flask containing approximately 75 ml. of triethylene tetramine and held for 12 hours at room temperature and then reacted at 160° F. for an hour. The finished fabric was washed with methyl alcohol and distilled water until the washings were acid to phenophthalein. The treated fabric was immersed in a 10 percent solution of sodium chloride in distilled water which subsequently became basic to phenophthalein. The fabric removed chlorine ions leaving a basic aqueous solution.

EXAMPLE V

Approximately 11 grams of fibrous cellulose acetate was reacted for 35 minutes at temperatures of 220° F. to 230° F. in a solution of approximately 270 grams of toluene diisocyanate and 30 grams of trimethyl phosphite. The intermediate reaction product was washed repeatedly with xylene until the wash solution was free of the isocyanate. Approximately one gram of the diisocyanate cellulose acetate intermediate product was reacted with about 70 ml. of triethylene tetramine for about two hours at 160° F. The product was held at room temperature and washed with methyl alcohol until the wash was free of the polyamine. The final reaction product then was immersed in 30 ml. of ethyl bromide and held at room temperature for 72 hours, drained and washed with methyl alcohol and subsequently with distilled water. The fabric then was immersed in 50 ml. of a 10 percent solution of sodium hydroxide and held for four hours, rinsed repeatedly in distilled water until the washings were acid to phenophthalein.

EXAMPLE VI

Portions of the polyisocyanate-cellulose acetate intermediate product as prepared in Example V were also reacted with approximately 50 ml. of ethylene diamine for 24 hours, heated and washed repeatedly with distilled water until there was no trace of the amine. The treated fabric changed to a brown or orange color with methyl red indicator.

EXAMPLE VII

Another portion of the polyisocyanate-cellulose acetate intermediate product as prepared in Example V was treated with a solution of approximately 10 ml. of hexamethylene diamine for 2 hours at 160° F. The product was washed repeatedly with distilled water until all traces of the amine were removed and then was submerged in a 10 percent sodium chloride aqueous solution which turned red with the addition of phenophthalein. The test indicated that the hexamethylene diamine-isocyanate-cellulose acetate product was an anion exchange material by the removal of chlorine ions from solution.

The use of modified cellulose ion-exchange compositions and particularly the fibrous materials is useful in fractionating and purifying protein, enzymes, hormones, etc., and more so in working with proteins or similar high molecular weight materials. They are valuable as carriers for catalysts or oxidizing agents and thus are useful as filters for either aqueous or gaseous media. Presently, it is possible, for example, to treat these ion-exchange cellulose materials with ceric salts to obtain an oxidizing agent which in its fibrous form can be used in tobacco products, such as cigarettes, to oxidize or absorb the harmful components of the smoke as it is drawn through the filter.

For purposes of description, certain specific examples have been employed but these are meant to be illustrative only. Numerous variations may be made with respect to the particular materials employed, the amounts utilized, etc., without departing from the spirit of the invention. It is desired, therefore, to be limited only by the scope of the appended claims.

The invention claimed is:

1. A method of preparing an ion-exchange composition which comprises reacting cellulose or its derivatives with a stoichiometric excess of a polyisocyanate under anhydrous conditions to obtain a cellulose-polyisocyanate intermediate having unreacted isocyanate groups; removing the excess polyisocyanate from said intermediate and subsequently reacting said intermediate with at least 0.1 moles of an aliphatic polyamine per unreacted isocyanate group to impart ion-exchange sites to the product.

2. The method of claim 1 further characterized in that the polyamine is an ethylene diamine.

3. The method of claim 1 further characterized in that the polyamine is triethylene tetramine.

4. The method of claim 1 further characterized in that the amount of the polyamine is sufficient to add to the intermediate ion-exchange capacites ranging up to about 3.5 meq. per gram of product.

5. A method of preparing an ion-exchange composition which comprises reacting 1 to 10 moles of cellulose or its derivatives with about 0.1 to 50 moles of a polyisocyanate under anhydrous conditions to obtain a cellulose-polyisocyanate intermediate having unreacted isocyanate groups, removing the excess polyisocyanate from said intermediate, and reacting the intermediate with at least 0.1 mole of an aliphatic polyamine to add ion-exchange sites to the product.

6. The method of claim 5 further characterized in that the cellulose is fibers of cellulose acetate.

7. The method of claim 5 further characterized in that the cellulose is fibers of cotton.

8. The method of claim 5 further characterized in that the amount of polyamine reacted with the cellulose-polyisocyanate is sufficient to add to the intermediate ion-exchange capacities ranging up to about 2.5 meq. per gram of product.

9. The method of claim 5 further characterized in that the polyamine is ethylene diamine.

10. The method of claim 5 further characterized in that the polyamine is triethylene tetramine.

11. An ion-exchange composition consisting essentially of the reaction product of cellulose or its derivatives, a polyisocyanate and an aliphatic polyamine; said reaction product characterized as having approximately 1 to 10 moles of the cellulose esterified with approximately 0.1 to 3.0 moles of the isocyanate and residual unesterified isocyanate groups; said unesterified isocyanate groups being chemically bound to sufficient amounts of an aliphatic polyamine to impart ion-exchange capacities ranging up to 3.5 meq. per gram of product.

12. The ion-exchange composition of claim 11 further characterized in that the cellulose is cotton fibers.

13. The ion-exchange composition of claim 11 further characterized in that the cellulose is cellulose acetate fibers.

14. The ion-exchange composition of claim 11 further characterized in that the product has approximately 2 to 6 moles of the cellulose esterified with approximately 1 to 1.5 moles of the polyisocyanate.

15. The ion exchange composition of claim 11 further characterized in that the polyamine is triethylene tetraamine.

References Cited by the Examiner

UNITED STATES PATENTS

| | | | |
|---|---|---|---|
| 2,339,912 | 1/1944 | Coffman et al. | 260—230 |
| 2,625,532 | 1/1953 | Seeger | 260—77.5 |
| 2,642,417 | 6/1953 | Wheaton et al. | 260—2.1 |

WILLIAM H. SHORT, *Primary Examiner.*

C. A. WENDEL, *Assistant Examiner.*